United States Patent
Mahmoud et al.

(10) Patent No.: US 9,624,335 B1
(45) Date of Patent: Apr. 18, 2017

(54) FUNCTIONALIZABLE MONOLITHIC PLATFORMS

(71) Applicant: KING SAUD UNIVERSITY, Riyadh (SA)

(72) Inventors: Kareem Youssif Hassan Mahmoud, Alexandria (EG); Zeid Abdullah Alothman, Riyadh (SA); Ayman Sadek Ahmed El-Faham, Alexandria (EG)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 15/151,469

(22) Filed: May 10, 2016

(51) Int. Cl.
*C08F 292/00* (2006.01)
*B01D 15/20* (2006.01)
*C08F 222/04* (2006.01)

(52) U.S. Cl.
CPC ............ *C08F 292/00* (2013.01); *B01D 15/20* (2013.01); *C08F 222/04* (2013.01)

(58) Field of Classification Search
CPC .............................. C08F 222/04; C08F 292/00
See application file for complete search history.

(56) References Cited

U.S. PATENT DOCUMENTS

| | | | |
|---|---|---|---|
| 5,917,006 A | 6/1999 | Smith et al. | |
| 7,205,161 B2 * | 4/2007 | Klaerner | G01N 33/54353 435/6.11 |

(Continued)

*Primary Examiner* — Robert C Boyle
(74) *Attorney, Agent, or Firm* — Richard C. Litman

(57) ABSTRACT

The method of preparing a functionalizable monolithic platform includes the steps of: functionalizing the silanol groups on a support having silanol groups or the ketone groups on a support having ketone groups with an organic compound having a vinyl group; and copolymerizing the alkenyl-functionalized silanol or ketone groups with itaconic anhydride monomers and vinyl monomers and/or a crosslinker having at least two vinyl reactive groups in a solvent by adding a suitable initiator for a time and temperature or radiation energy sufficient to thereby complete the copolymerization reaction process. The functionalizable monolithic platform has the structural formula:

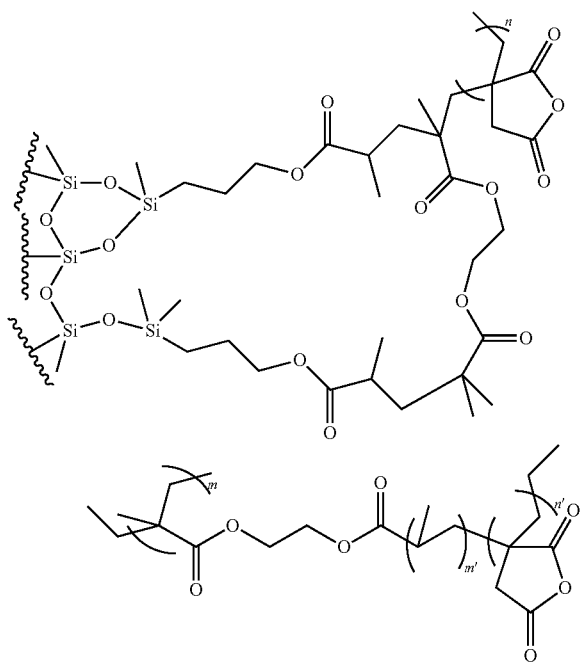

wherein n, m, n' and m' are integers greater than 0.

8 Claims, 8 Drawing Sheets

(56) References Cited

U.S. PATENT DOCUMENTS

| | | |
|---|---|---|
| 8,889,783 B2 | 11/2014 | Hayes |
| 2006/0083710 A1* | 4/2006 | Joerger .................. A01N 43/16 424/76.1 |
| 2014/0228474 A1* | 8/2014 | Qian .................... A61K 6/0835 523/116 |

* cited by examiner

FUNCTIONALIZABLE MONOLITHIC PLATFORMS

BACKGROUND OF THE INVENTION

1. Field of the Invention

The present invention relates to separation polymers, and particularly to functionalizable monolithic platforms that are an organic, polymeric, monolith material having a continuous three-dimensional network porous structure, which contains a functionalizable itaconic anhydride group.

2. Description of the Related Art

The main advantage of monolithic materials over porous particles is the presence of interconnected channels forming a continuous network structure. Continuous bed monolithic materials are characterized by a bimodal pore structure having large through-pores that provide monoliths with high permeability compared to conventional macroporous materials, and also small micropores, leading to more efficient separation and/or purification. Monolithic porous organic materials are always prepared by in-situ polymerization of monomers dissolved in a porogenic solvent mixture directly on and/or inside the final mold (e.g., column, plate, channel, reservoir etc.) via thermal radical, photochemical or radiochemical process.

Post-polymerization modification has become a familiar technique in the preparation of monolithic materials. The aim of post-polymerization modification is to separate the selectivity of the monolithic media from its morphology. The modification of surface chemistry after polymerization to meet the desired application in a morphologically optimized monolithic media leads to high efficiency and reproducibility. A straight-forward method for post-polymerization modification is to include a reactive monomer, such as glycidyl methacrylate (GMA), N-acryloxysuccinimide (NAS), vinyl azlactone (VAL), or maleic anhydride into the monolithic matrix, which could be modified later to the desired surface chemistry. It would be desirable to modify and functionalize organic monolithic material containing itaconic anhydride by immobilization of amine or hydroxyl compounds through amidation or esterification reaction, respectively, in order to impart a variety of properties suitable for various applications, such as positive or negative electric charges, chiral selectors, specific groups, catalytic sites, etc.

Thus, functionalizable monolithic platforms solving the aforementioned problems are desired.

SUMMARY OF THE INVENTION

The functionalizable monolithic platforms include a porous copolymeric monolithic material having the following structural formula:

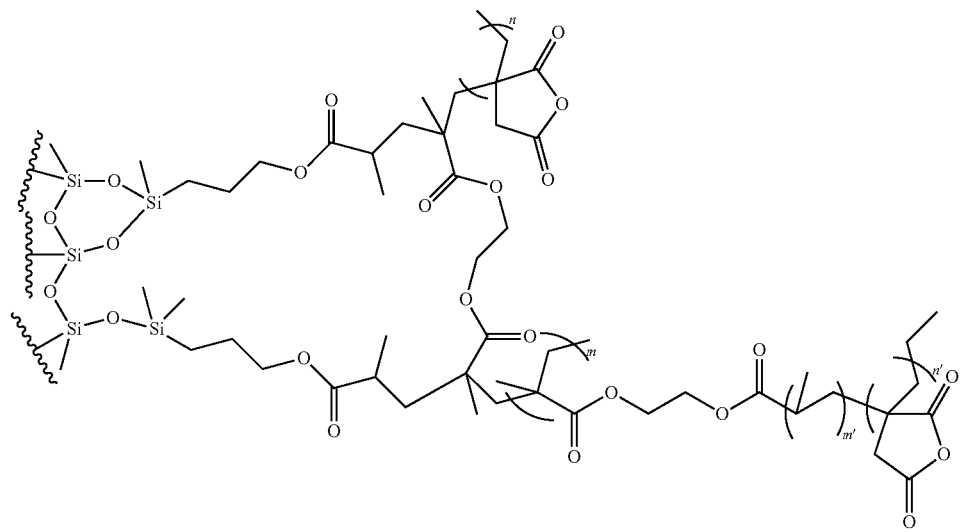

wherein the n, m, n' and m' are integers greater than 0.

An example of the functionalizable monolithic platform includes a porous copolymeric monolithic material, which, after amidation using a primary amine, is represented by the following structural formula:

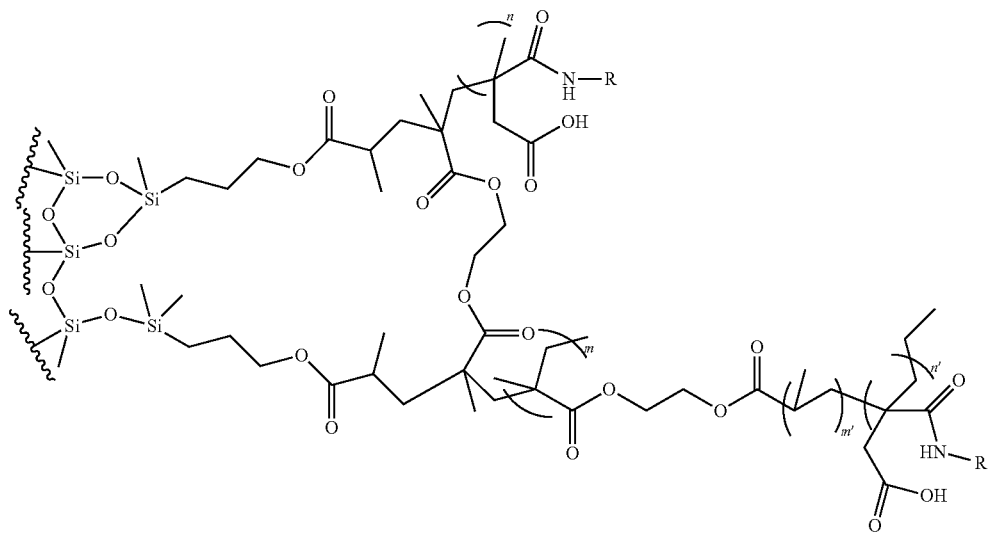

wherein R represents hydrogen atom or any aromatic or aliphatic organic or bioorganic compound, and wherein n, m, n' and m' are integers greater than 0.

A method of preparing a porous copolymeric monolithic material on a support having silanol groups comprises the steps of: functionalizing the silanol groups with an organic compound having an alkenyl group; and copolymerizing the alkenyl-functionalized silanol groups with itaconic anhydride monomers and a vinyl monomer and/or a crosslinker having at least two vinyl reactive groups in a solvent by adding a suitable initiator for a time and temperature or radiation energy sufficient to thereby complete the copolymerization reaction process and prepare a porous monolithic material. The support also may have a ketone group, which is first hydroxylated, followed by reacting the hydroxyl group with a compound having an active vinyl group that is later involved in the polymerization process.

The method of preparing a porous copolymeric monolithic material on a support having silanol groups can further comprise subjecting the porous monolithic material to an amidation or esterification reaction with a primary amine or a hydroxyl compound, respectively, to functionalize the desired organic or bioorganic functional groups on the porous monolithic platform material.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
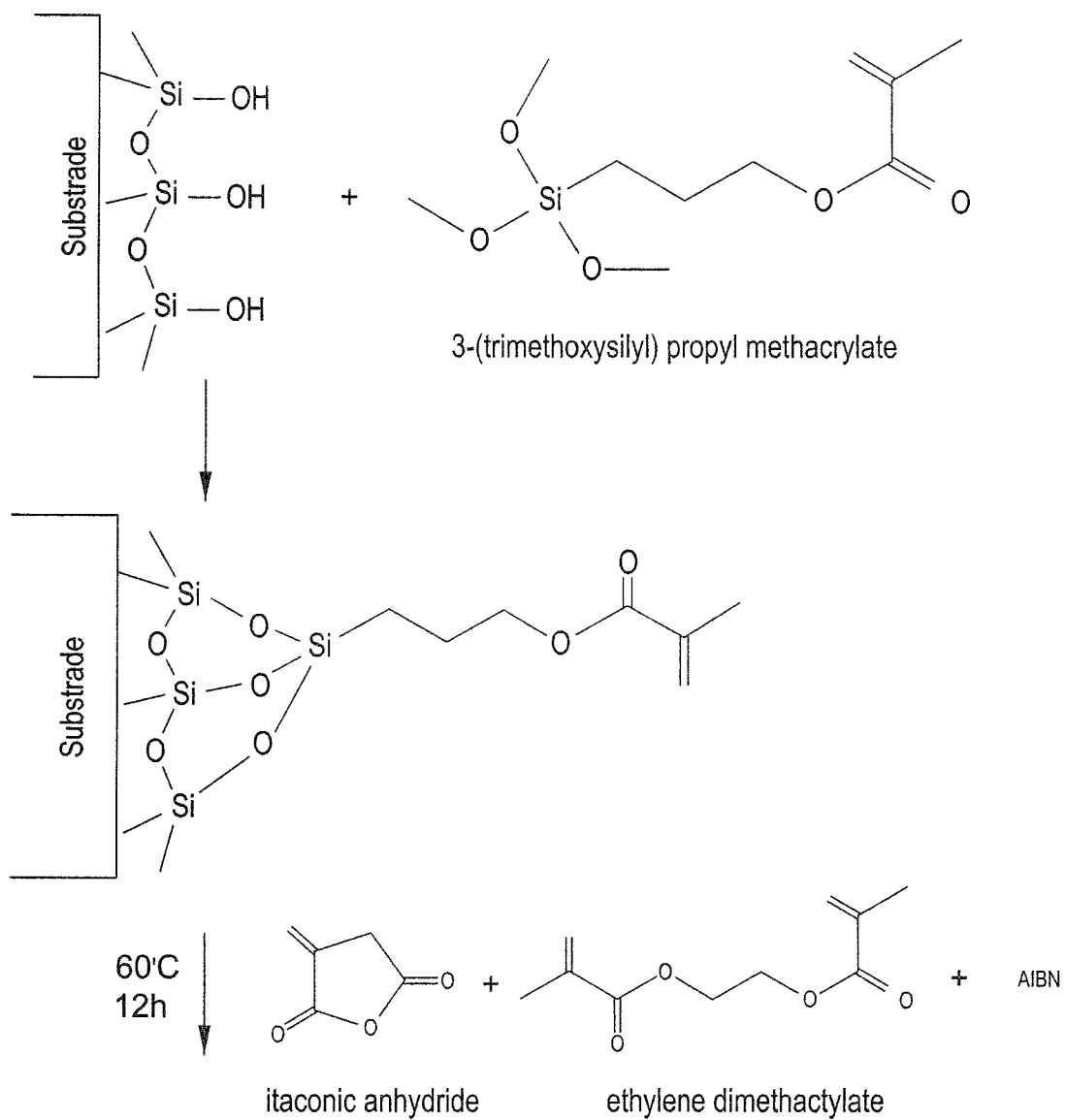
FIGS. 1A and 1B show a reaction scheme for preparing a functionalizable monolithic platform according to the present invention.

A method of preparing a functionalizable monolithic platform comprises the steps of functionalizing the silanol groups on a support having silanol groups with an organic compound having an alkenyl group; and copolymerizing the alkenyl-functionalized silanol groups with itaconic anhydride monomers and a vinyl monomer and/or a crosslinker having at least two vinyl reactive groups in a solvent by adding a suitable initiator for a time and temperature or radiation energy sufficient to thereby complete the copolymerization reaction process and prepare a porous monolithic material represented by the following structural formula:

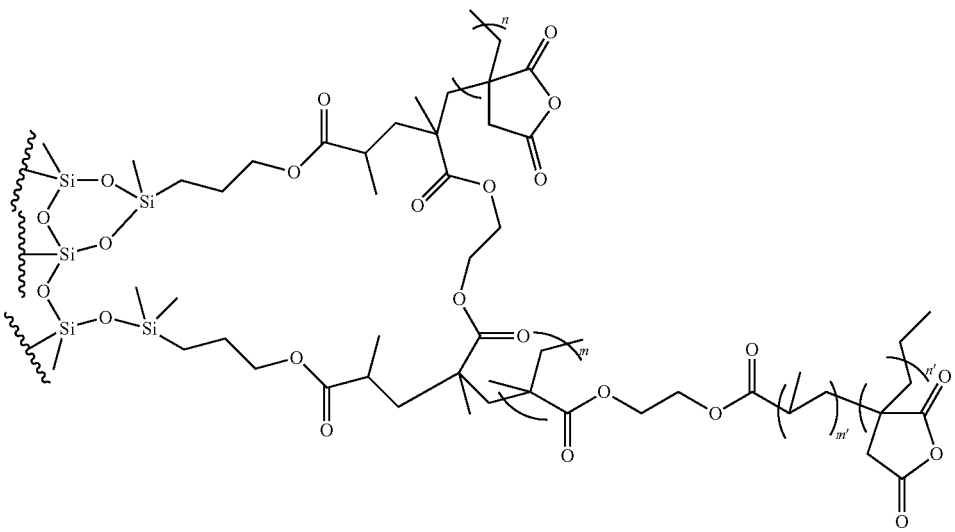

wherein the n, m, n' and m' are integers greater than 0.

The method of preparing the functionalizable monolithic platform may further comprise subjecting the porous monolithic material to an amidation or esterification reaction with a primary amine or a hydroxyl compound, respectively, to functionalize the desired organic or bioorganic functional groups on the porous monolithic platform material to prepare compounds of the following structural formula:

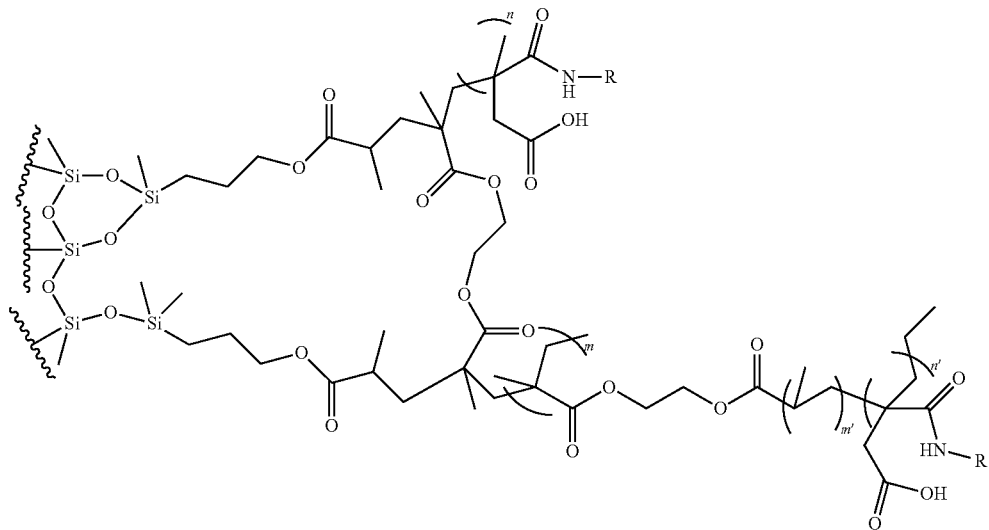

wherein R represents hydrogen atom, any aromatic or aliphatic organic or bioorganic compound and wherein n, m, n' and m' are integers greater than 0. Typically, the polymerization reaction is conducted at a temperature range from 50-120° C. for a time ranging from 6-24 h. The crosslinking initiator can be azobisisobutyronitrile (AIBN) or any suitable initiator. The support of the monolithic materials can be selected from the group consisting of glass, fused silica, or PEEK tubing having a diameter of 5 μm to 100 mm, or a flat support. The solvent used in the reaction process can consist of a single organic solvent or a mixture of organic solvents consisting of aliphatic hydrocarbons, aromatic hydrocarbons, esters, alcohols, ketones, or ethers. The porous monolith platform forms a porous three-dimensional structure.

The monolithic organic polymeric material prepared according to the method could be chemically modified after preparation and optimization of its porosity and hydrodynamic properties to meet a specific application. The organic monolithic material is prepared through the in-situ polymerization of a monomers and/or crosslinkers mixture with itaconic anhydride co-monomer in a suitable solvent or solvent mixture in an appropriate mold, and its walls can be modified with a spacer that is able to covalently bond to the monolithic material. The polymerization process could be initiated thermally, photochemically, or radiochemically, and the prepared monolith could be used for various separation and/or purification purposes.

Most of the available monolithic materials used for separation and/or purification are optimized morphologically and chemically for a single specific application, while the functionalizable monolithic materials are separating the morphology optimization from the chemical properties, thereby giving a monolithic material with the same porosity and permeability properties, but differing in chemical nature for different applications. Furthermore, the currently used functionalizable groups, such as azlactone and epoxy groups, have low reactivity and need severe conditions for modification. Maleic anhydride is a quite successful monomer for introducing a functional group to the monolithic material. However, itaconic anhydride is a more reactive monomer through the formation of highly reactive tertiary radicals.

The support of the monolithic material can be a glass or fused silica hollow tubular simple mold, such as a column or capillary (diameter 5 μm to 100 mm). Also, it could be a hollow microsystem, such as channels, reservoirs, chambers, and branch points consisting of one material or a combination of materials, such as metals, polymers, glass and fused silica, with a diameter of between 50 nm and 10 cm. Flat plates are also suitable as a support for the monolithic material.

Post-synthetic modification allows for manipulation of the chemical nature of the functionalizable monolith to be suitable for several separation and/or purification applications. Chromatographic applications are the preferred embodiment for the monolithic platforms in either analytical or preparatory scales, using gas, liquid or supercritical fluid as a mobile phase, in a column or plane mold including, but not limited to, normal-phase chromatography, reverse-phase chromatography, affinity chromatography, ionic chromatography, electro-chromatography, hydrophilic interaction chromatography, thin layer chromatography and chiral chromatography. The monolithic platform is also useful for other separation and/or purification techniques, such as but not limited to, reactors, sensors in detection devices, solid phase extraction, and analytical microsystems.

Treatment of the support walls is a desirable step in order to fix the monolithic material to the mold under high pressure applications, and it is possible to modify these surfaces with a nucleophilic compound compatible with the polymerization mixture. For example, the silanization of glass or silica walls with silane containing methacryl functional groups may be used by using methacrylate monomers, such as 3-(trimethoxysilyl) propyl methacrylate (TMSM) or γ-methacryloxypropyl trimethoxysilane (γ-MAPS). Another example is the hydroxylation of ketone groups of a polyether ether ketone (PEEK) support, followed by reacting the hydroxyl group with a compound having an active vinyl group, which later is involved in the polymerization process. Accordingly, the walls modifier could be covalently bonded to itaconic anhydride monomers within the polymerization mixture, for example, silane containing amine functions fixed to glass or silica support such as N-(6-aminohexyl) aminomethyltriethoxysilane or N-(2-aminoethyl)-11-aminoundecyltrimethoxysilane.

The functionalizable monolithic platform is prepared by the polymerization of (1) itaconic anhydride, (2) a monomer having a reactive vinyl group, such as vinyl aromatics, vinyl ethers, acrylic and methacrylic esters, and/or (3) a cross-linker having at least two vinyl reactive groups, such as divinyl benzene or ethylene dimethacrylate. The polymerization reaction could be any suitable reaction, but free-radical reaction between vinyl groups is the preferred embodiment. Initiators for the free-radical reaction include, but are not limited to, conventional heating, eco-friendly conditions (ultra-sonic, UV, microwaves), X-ray, gamma ray, and catalyst. Preferably, the thermal initiator for the present monolithic platform is chosen to be azobis-isobutyronitrile (AIBN). The limited solubility of itaconic anhydride and the reactivity of its anhydride functional group must be taken into account through a judicious choice of reagents, including monomers, porogens, initiators, and the initiation process. The porogen used to prepare the monolith could be one or a mixture of various types of materials, such as aliphatic hydrocarbons, aromatic hydrocarbons, esters, alcohols, ketones and ethers. The porogen generally represents about 45 to 90 vol % of the polymerization mixture.

Primary amines and hydroxyl compounds are the suitable functional groups through amidation or esterification, respectively, with itaconic anhydride. The general formula for primary amines is R—$NH_2$, and for primary hydroxyl compounds is R—OH, where R could be any aromatic or aliphatic organic compound, it may also be any bioorganic compound, such as, but not limited to, carbohydrates, proteins, lipids, nucleic acids, antibodies and amino acids according to the desired chemical nature of the monolith.

The present teachings will be understood more readily by reference to the following examples, which are provided by way of illustration.

Example 1

Preparation of a Functionalizable Monolith Material

Figure 1B:
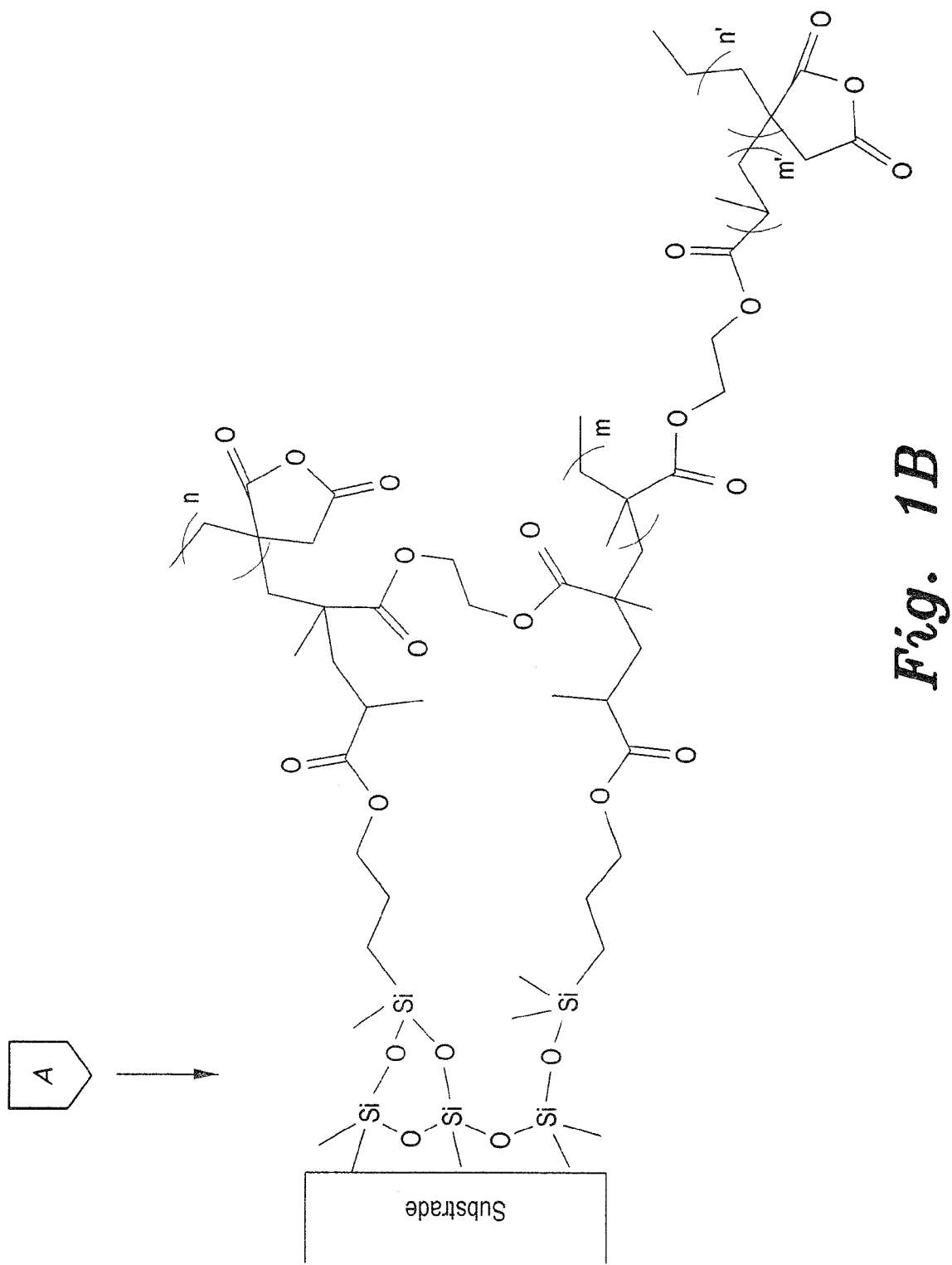
Figure 2:
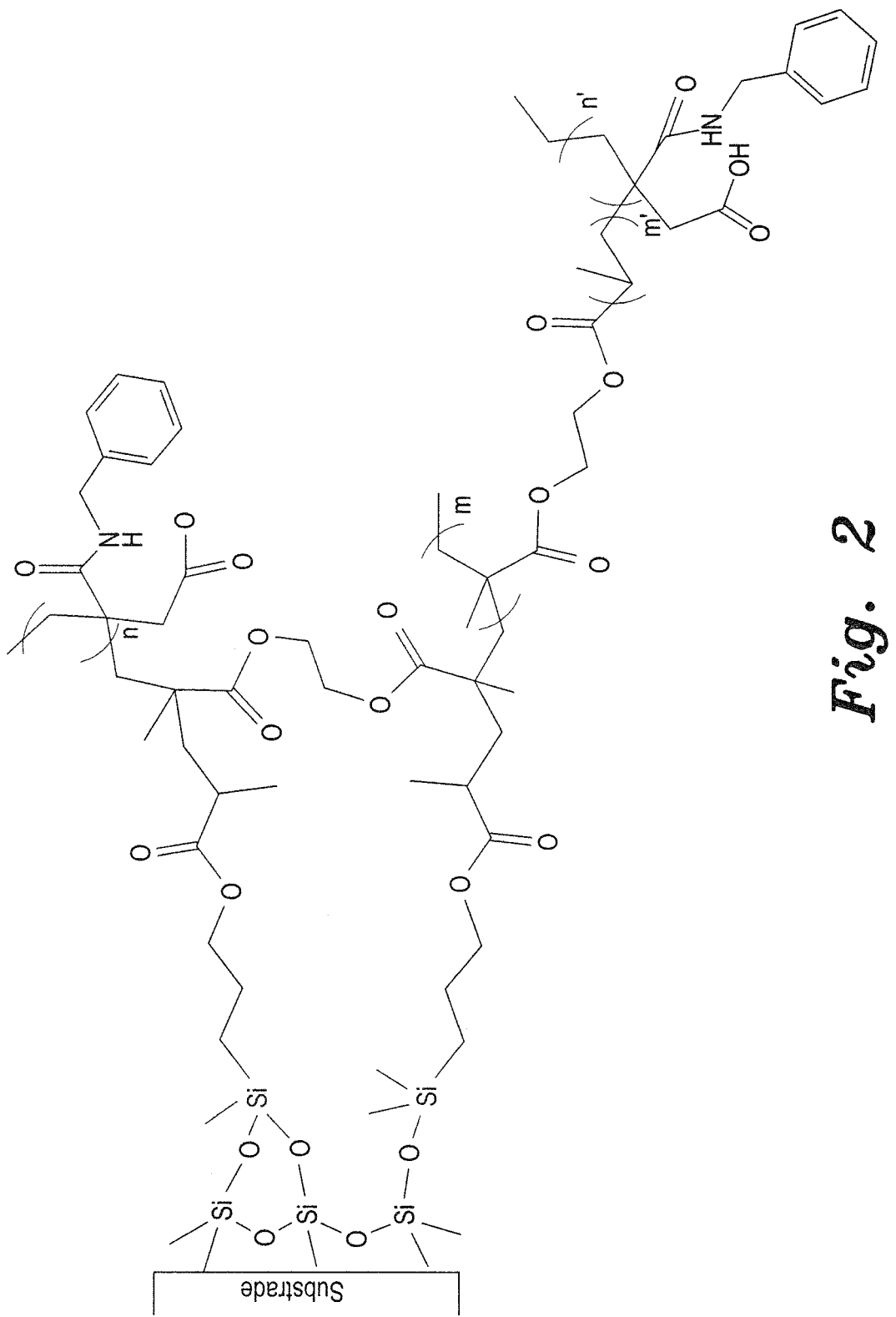
FIG. 2 is a structural formula of a functionalizable monolithic platform according to the present invention after amidation with phenylamine.
Figure 3:
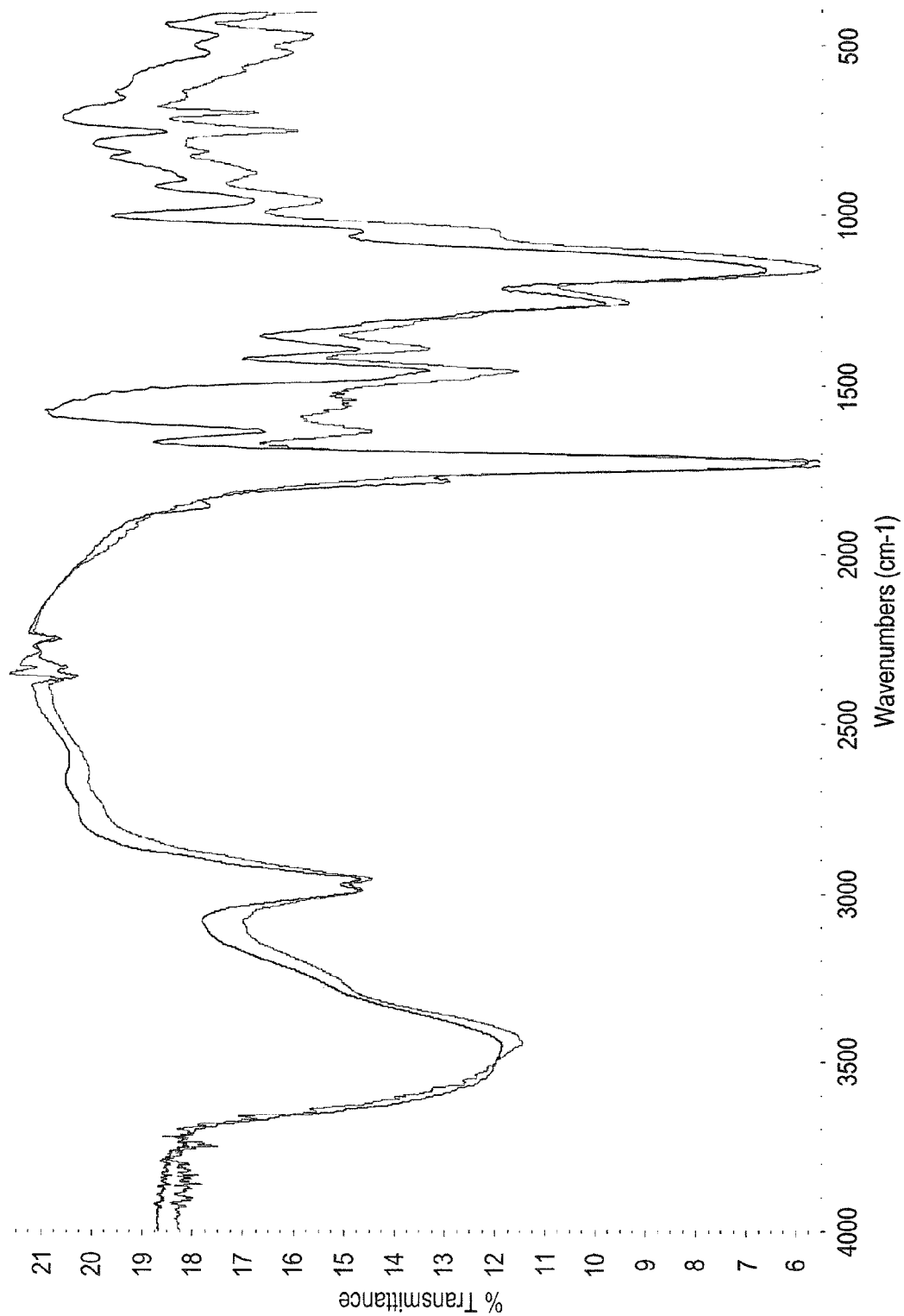
FIG. 3 is a comparison between the infrared spectra of a functionalizable monolithic platform according to the present invention before (gray line spectrum) and after (black line spectrum) amidation with phenylamine.

Ethylene dimethacrylate (EDMA) was used as a cross-linker and monomer with itaconic anhydride without any further monomers in a fused silica capillary column as a substrate. The functionalizable monolith was then modified after polymerization in-situ with phenylamine to add a benzene ring functions. In order to activate the inner surface of the capillary column, a fused silica tubing (200 mm×0.25 mm i.d.) was rinsed with a 1.0 mol/L NaOH solution for 5 min and steeped in the same solution for 10 min. Afterwards, it was rinsed with water for 2 min and then flushed with 1.0 mol/L HCl for 2 min and dried with air for 5 min. The capillary was then rinsed with toluene for 10 min and flushed with a 10% 3-(trimethoxysilyl) propyl methacrylate (TMSM) in toluene solution for 10 min before soaking in toluene for 2 h. Finally, it was rinsed with toluene for 5 min and dried with air for 5 min. The monolithic material was prepared using 3% itaconic anhydride (w/w), 26% ethylene dimethacrylate (w/w) as the cross-linker and monomer and 1% AIBN as the initiator (FIGS. 1A and 1B). The porogenic solvent was 60% (v/v) THF and 40% (v/v) nonanone, representing 70% (w/w) of the total polymerization mixture. The polymerization mixture was then mixed into a homogenous solution, sonicated and purged with helium gas for 5 min. The activated capillary column was then filled with the reactant solution and sealed at both ends. The polymerization was performed at 60° C. for 12 h in a water bath. After that, the seals were removed and the prepared column was connected to an HPLC pump and washed with acetonitrile to remove the unreacted materials and extra solvent. A 10% solution of phenylamine in acetonitrile was pumped into the capillary column with 1 ml/min flow rate for 2 h. As shown in FIG. 2, amidation reaction took place between phenylamine and itaconic anhydride moieties to provide the monolith with benzene ring functional groups. FIG. 3 shows the Fourier-Transform Infra-Red (FTIR) spectrum for the prepared monolith before and after modification, the absence of CO (anhydride) stretch band at 1825 $cm^{-1}$ after modification (black line spectrum) indicating a successful amidation.

Figure 4:
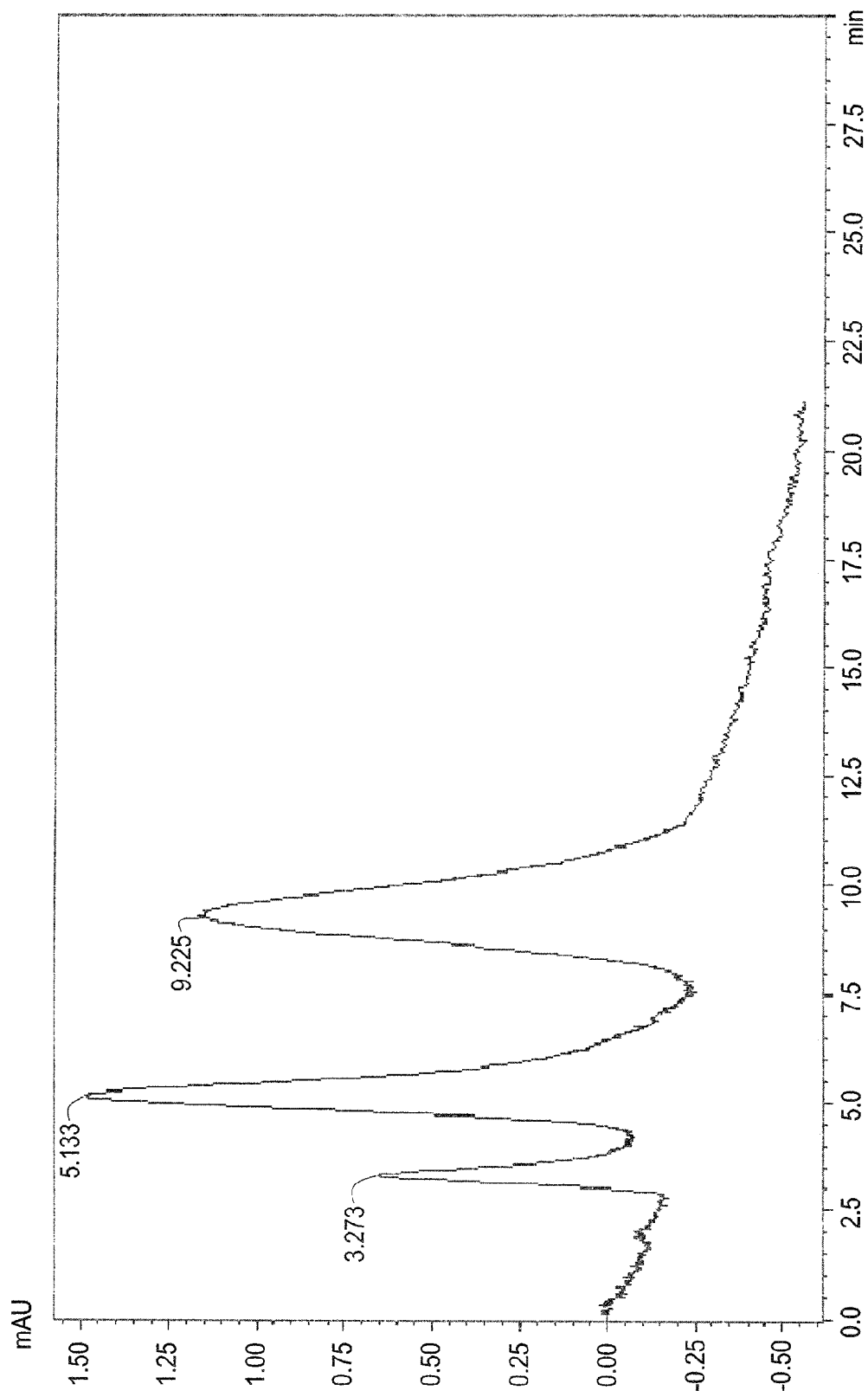
FIG. 4 is a comparison between the infrared spectra of a functionalizable monolithic platform according to the present invention before (gray line spectrum) and after (black line spectrum) amidation with octadecylamine.

The organic monolithic material is covalently bonded to a hollow or plane support, and therefore it is suitable for the separation and/or purification of organic compounds, chiral mixtures and bio-organic compounds. For example, the separation of benzene, naphthalene and anthracene was performed using the modified monolith with benzene rings. FIG. 4 is an exemplary chromatogram showing separation of benzene, naphthalene and anthracene using 50% aqueous acetonitrile solution at room temperature and at a flow rate of 5 ml/min. Detection was carried out using ultraviolet detector at 260 nm. The first peak is assigned for benzene the second for naphthalene and the third for anthracene.

Example 2

Preparation of Itaconic Anhydride-Co-Ethylene Dimethacrylate Co-Polymer

In Example 2 the same itaconic anhydride-co-ethylene dimethacrylate co-polymer was prepared, but the itaconic anhydride was functionalized using octadecylamine to add a C18 alkyl chain as functional groups for use in a reverse phase liquid chromatography separation column.

Figure 5:
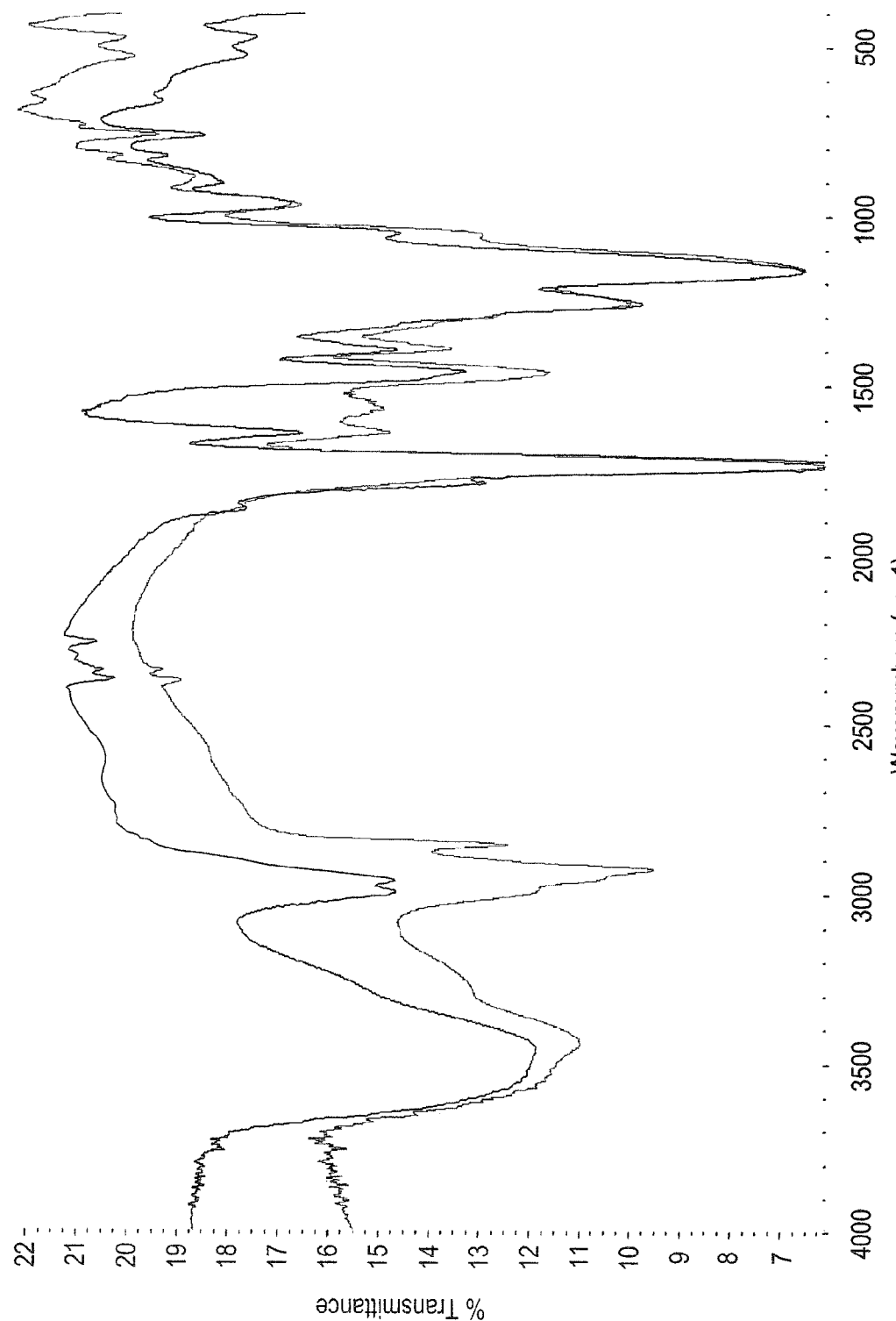
FIG. 5 is a chromatogram showing the separation of benzene, naphthalene and anthracene using a functionalizable monolithic platform according to the present invention functionalized with benzene ring.

The same procedure in Example 1 was used in a smaller diameter fused silica tubing (200 mm×0.15 mm i.d.). The monolith was prepared using 2% itaconic anhydride (w/w), 27% ethylene dimethacrylate (w/w) as the cross-linker and monomer and 1% AIBN as the initiator. The porogenic solvent consists of 70% (v/v) methyl ethyl ketone and 30% (v/v) cyclohexanone, representing 70% (w/w) of the total polymerization mixture. A 10% solution of octadecylamine in acetonitrile was used for post-synthetic modification. FIG. 5 shows the FTIR spectrum for the prepared monolith before and after modification, the absence of CO (anhydride) stretch band at 1825 $cm^{-1}$ after modification (black line spectrum) indicating a successful amidation reaction.

Figure 6:
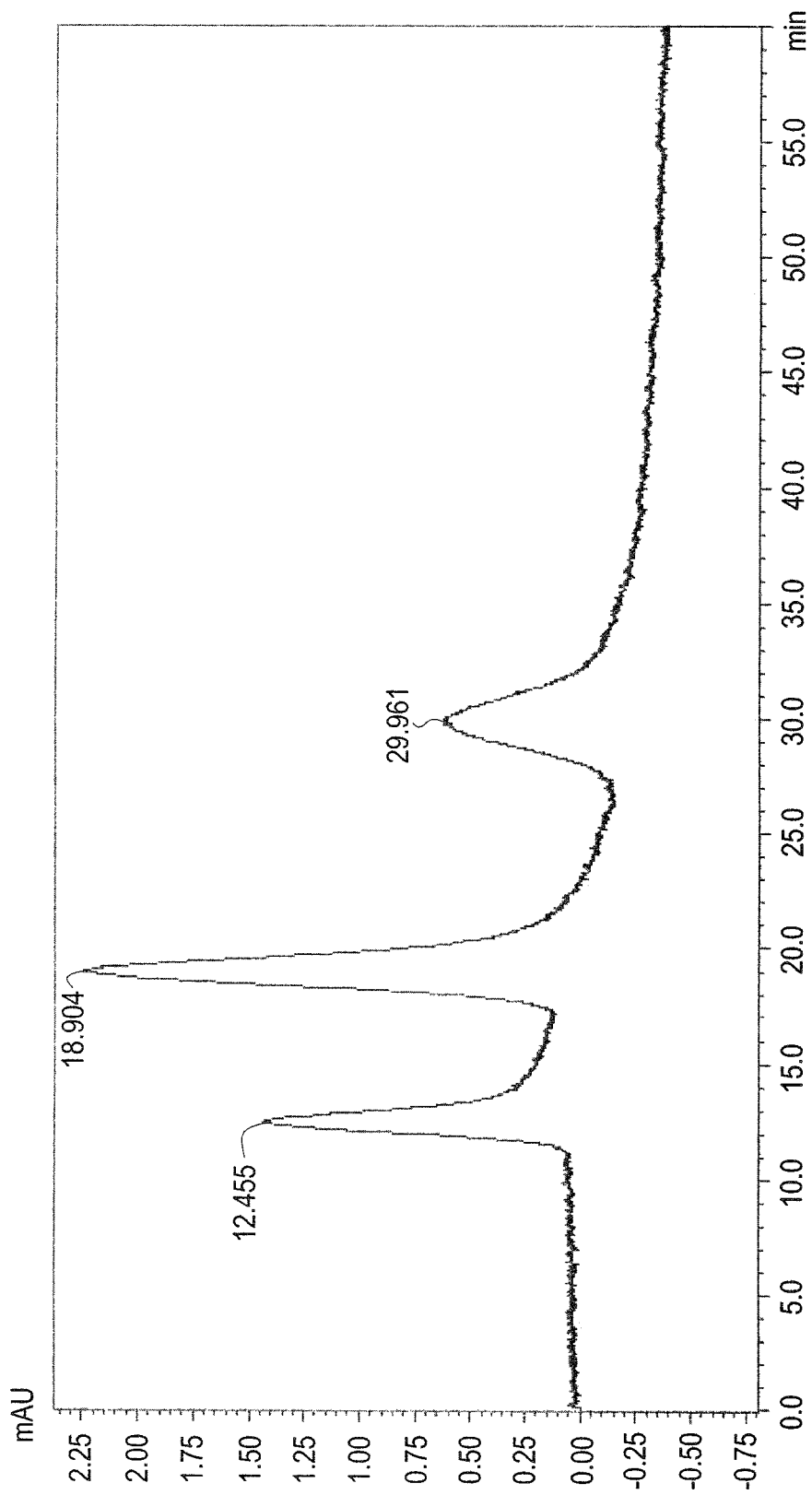
FIG. 6 is a chromatogram showing the separation of aminophenol, phenol and chlorophenol using a functionalizable monolithic platform according to the present invention functionalized with C18 saturated chain.

FIG. 6 shows the chromatogram of aminophenol, cresol and chlorophenol separation that was performed using the modified monolith with C18 chain. The mobile phase consisted of 60% aqueous acetonitrile solution and 0.1% formic acid at room temperature using a flow rate of 1 ml/min. Detection was carried out using an ultraviolet detector at 260 nm. The first peak is assigned for aminophenol, the second for cresol, and the third for chlorophenol.

Figure 7:
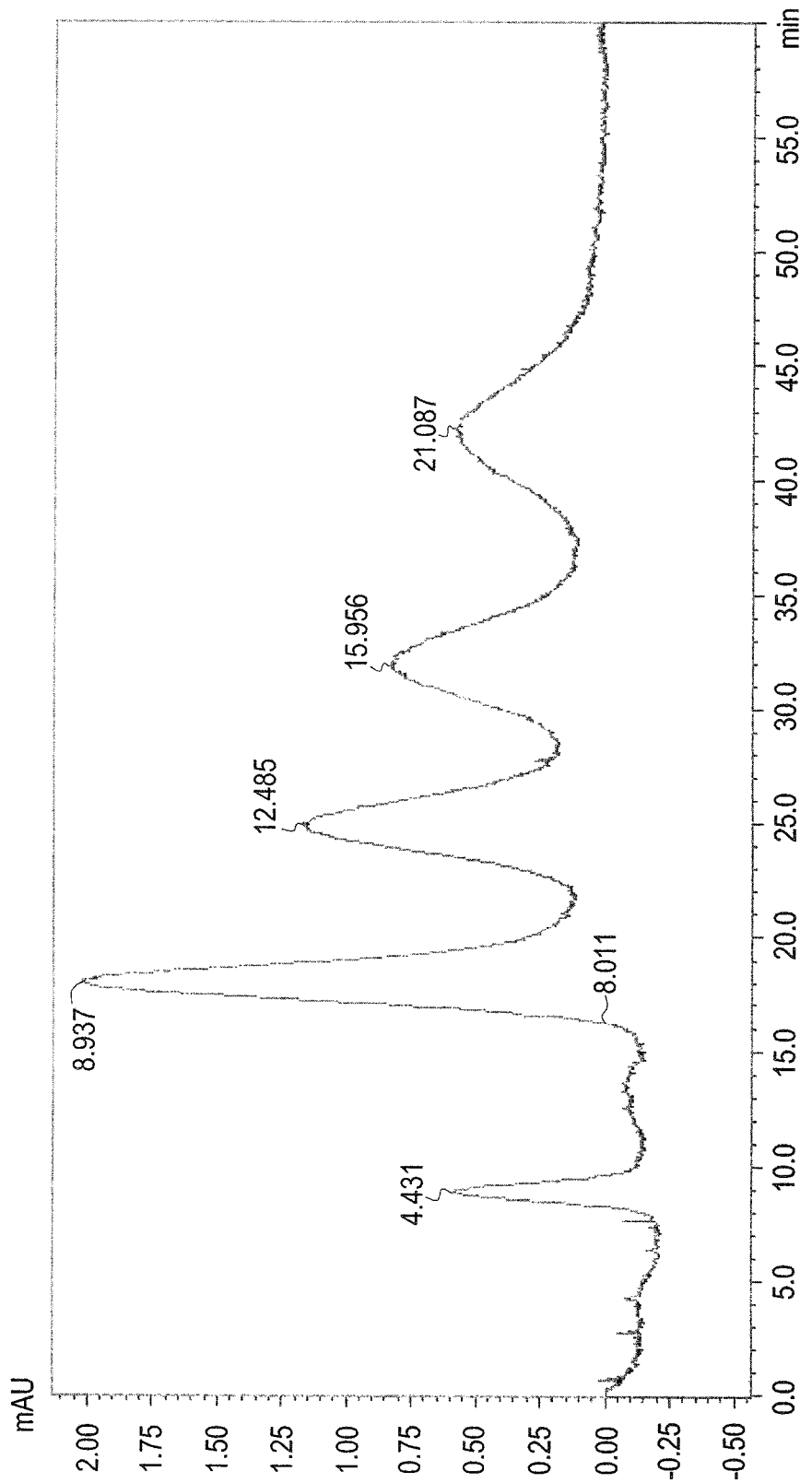
FIG. 7 is a chromatogram showing the separation of uracil, toluene, ethylbenzene, propylbenzene and butylbenzene using a functionalizable monolithic platform according to the present invention functionalized with C18 saturated chain.

Separation of uracil, toluene, ethylbenzene, propylbenzene and butylbenzene was performed using the modified monolith with C18 alkyl chain. FIG. 7 is a chromatogram showing separation of the mentioned mixture using 45% aqueous acetonitrile solution and 0.01% ammonia at room temperature and at a flow rate of 3 ml/min. Detection was carried out using an ultraviolet detector at 254 nm. The peaks are assigned for uracil, toluene, ethylbenzene, propylbenzene and butylbenzene respectively.

It is to be understood that the present invention is not limited to the embodiments described above, but encompasses any and all embodiments within the scope of the following claims.

We claim:

1. A functionalizable monolithic platform having the structural formula:

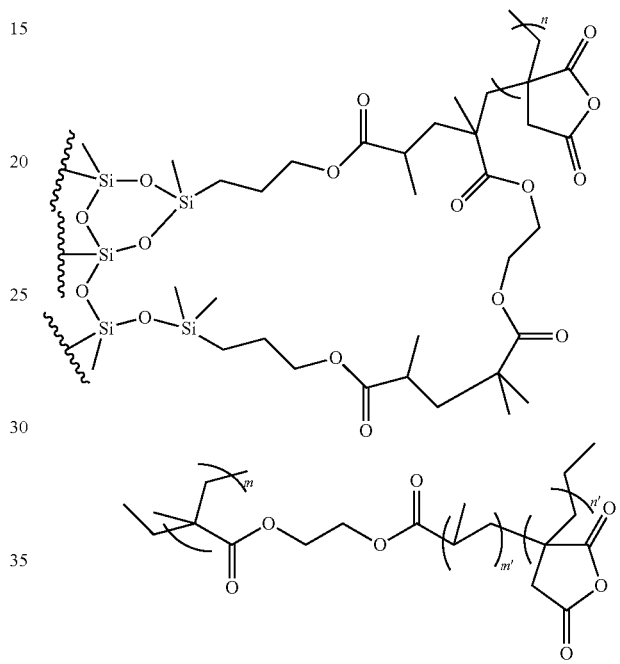

wherein n, m, n' and m' are integers greater than 0.

2. A functionalized monolithic platform having the structural formula:

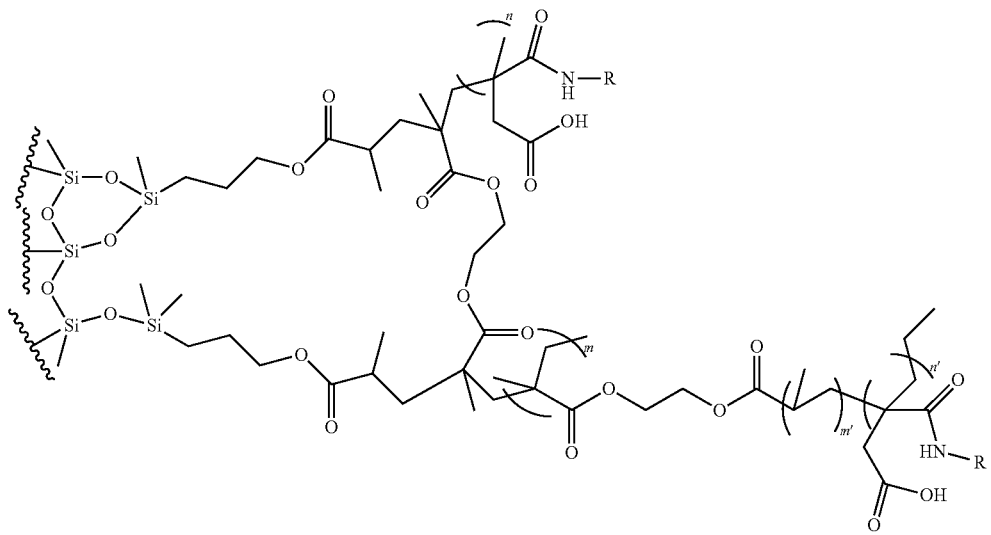

wherein R represents hydrogen atom or any aromatic or aliphatic organic or bioorganic compound, and wherein n, m, n' and m' are integers greater than 0.

3. A method of preparing a functionalizable monolithic platform, comprising the steps of:
on a support having silanol groups, functionalizing the silanol groups with an organic compound having a vinyl group, or in a support having ketone groups, functionalizing the ketone groups with an organic compound having a vinyl group;
copolymerizing the vinyl-functionalized silanol or ketone groups with itaconic anhydride monomers and a vinyl monomer and/or a crosslinker having at least two vinyl reactive groups in a solvent, including adding an initiator, for a time and temperature or radiation energy sufficient to complete the copolymerization reaction process, thereby forming a porous monolithic material, wherein the functionalizable monolithic platform has the structural formula:

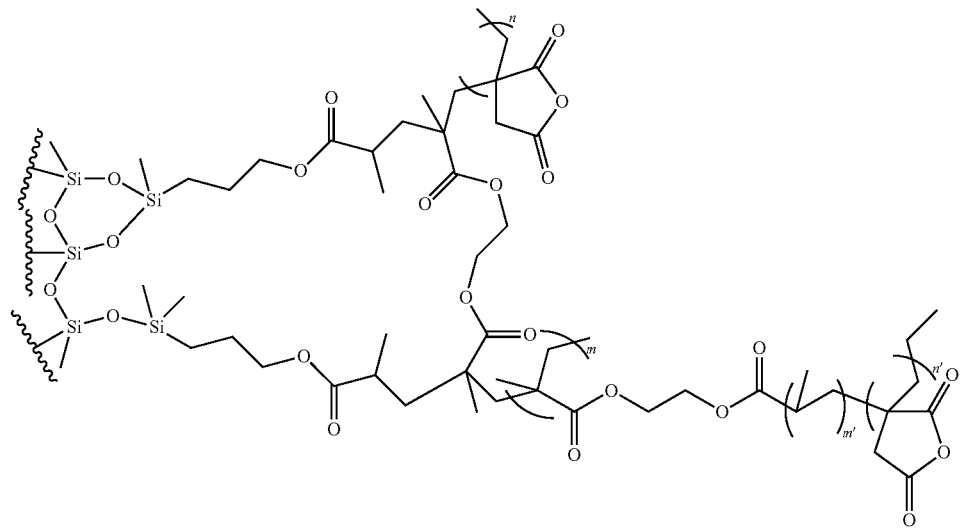

wherein n, m, n' and m' are integers greater than 0.

4. The method of preparing a functionalized monolithic platform according to claim 3, wherein the monolithic platform functionalized through amidation has the structural formula:

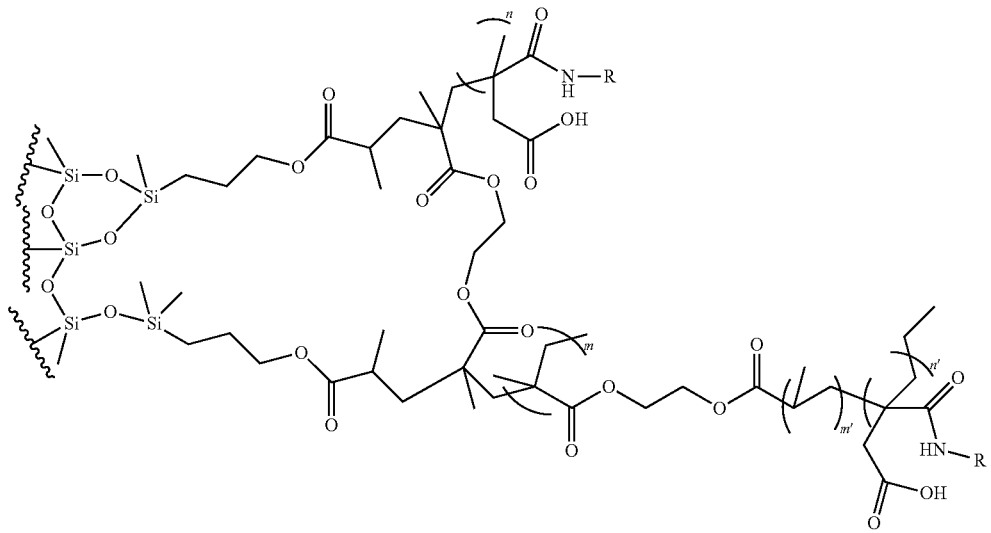

wherein R represents hydrogen atom or any aromatic or aliphatic organic or bioorganic compound, and wherein n, m, n' and m' are integers greater than 0.

5. The method of preparing a functionalizable monolithic platform according to claim 3, wherein the copolymerization is conducted at a temperature between 50 and 120° C. and for a time between 6 and 24 h.

6. The method of preparing a functionalizable monolithic platform according to claim 3, wherein the polymerization initiator comprises azobisisobutyronitrile as a free-radical reaction initiator.

7. The method of preparing a functionalizable monolithic platform according to claim 3, wherein the support is selected from the group consisting of glass, fused silica, PEEK capillary tubing, and a PEEK flat plate.

8. The method of preparing a functionalizable monolithic platform according to claim 3, wherein the solvent is at least one organic solvent selected from the group consisting of aliphatic hydrocarbons, aromatic hydrocarbons, esters, alcohols, ketones, and ethers.

* * * * *